United States Patent [19]
Logan et al.

[11] Patent Number: 5,901,030
[45] Date of Patent: May 4, 1999

[54] ELECTROSTATIC CHUCK EMPLOYING THERMOELECTRIC COOLING

[75] Inventors: Joseph Logan, Jamestown, R.I.; Robert Tompkins, Millbrook, N.Y.

[73] Assignee: Dorsey Gage, Inc., Poughkeepsie, N.Y.

[21] Appl. No.: 08/982,914

[22] Filed: Dec. 2, 1997

[51] Int. Cl.⁶ ................................................ H02N 13/00
[52] U.S. Cl. .......................................... 361/234; 279/128
[58] Field of Search ..................................... 361/230–235; 279/128

[56] References Cited

U.S. PATENT DOCUMENTS

| | | |
|---|---|---|
| 4,194,233 | 3/1980 | Jones et al. . |
| 4,502,094 | 2/1985 | Lewin et al. . |
| 4,645,218 | 2/1987 | Ooshio et al. . |
| 5,001,423 | 3/1991 | Abrami et al. . |
| 5,155,652 | 10/1992 | Logan et al. . |
| 5,191,506 | 3/1993 | Logan et al. ............................. 361/234 |
| 5,255,153 | 10/1993 | Nozawa et al. ......................... 361/234 |
| 5,280,156 | 1/1994 | Niori et al. . |
| 5,436,790 | 7/1995 | Blake et al. ............................. 361/234 |
| 5,556,043 | 9/1996 | Kawada et al. . |
| 5,584,183 | 12/1996 | Wright et al. . |
| 5,606,484 | 2/1997 | Kawada et al. . |
| 5,663,865 | 9/1997 | Kawada et al. . |
| 5,665,260 | 9/1997 | Kawada et al. . |
| 5,667,622 | 9/1997 | Hasegawa et al. ....................... 156/345 |
| 5,740,016 | 4/1998 | Dhindsa ................................. 361/704 |

FOREIGN PATENT DOCUMENTS

4-87321  3/1992  Japan .

*Primary Examiner*—Fritz Fleming
*Attorney, Agent, or Firm*—Joseph L. Spiegel

[57] ABSTRACT

An electrostatic chuck employs thermoelectric cooling technology. The chuck includes a conductive circular base with an upper ring portion forming a first pole piece electrically isolated from an annular portion forming a second pole piece. The upper surface of the pole pieces have a dielectric material formed thereon and together form the electrostatic clamping surface for an article to be held thereon. The backside is provided with an annular recess containing a plurality of thermoelectric devices or modules and intervening spokes. The devices are covered with a heat sink or cooling plate through which a fluid such as water is circulated. A retaining back ring covers the water plate which is secured to the base by bolts. Uniform pressure is applied to the water plate and modules by means of spring washers inserted between back ring and water plate.

2 Claims, 3 Drawing Sheets

ELECTROSTATIC CHUCK EMPLOYING THERMOELECTRIC COOLING

BACKGROUND OF INVENTION

1. Field of Invention

This invention relates to an electrostatic chuck used for holding articles such as semiconductor wafers, dielectric substrates, panel displays and the like during processing and, in particular, to such a chuck employing thermoelectric heating or cooling.

2. Description of the Prior Art

There are known techniques for applying heat to an electrostatic chuck and in turn to a wafer clamped thereon during semiconductor processing.

Niori, et al, U.S. Pat. No. 5,280,156 describes an electrostatic chuck whose ceramic substrate or body has a heat generating element embedded therein. The heat generating element is energized to heat a wafer-attracting surface of the chuck to a desired temperature which in turn can heat a wafer positioned thereon uniformly.

Kawada, et al, U.S. Pat. No. 5,556,043 relates to a ceramic electrostatic chuck, with built-in heater, the heater being a heat generating layer made from an electrostatic ceramic. Other electrostatic chuck U.S. patents with heat generating layers are: Kawada, et al, U.S. Pat. No. 5,606,484; Kawada, et al, U.S. Pat. No. 5,663,865; and, Kawada, et al, U.S. Pat. No. 5,665,260.

Also known are various techniques for wafer cooling during semiconductor processing.

In Jones, et al, U.S. Pat. No. 4,194,233 an inert gas is used to conduct away the heat normally produced during processing.

Lewin, et al, U.S. Pat. No. 4,502,094 discloses an electrostatic chuck in which temperature variations across the semiconductor wafer are minimized by the use of a plurality of closely spaced conductor pillows in contact with the wafer and extending therefrom to a heat sink.

In U.S. Pat. No. 4,645,218 to Ooshio, et al, the chuck body is provided with a plurality of channels for passing a cooling medium there through in order to cool the wafers.

Logan, et al, U.S. Pat. Nos. 5,155,652 and 5,191,506, utilize heat sinks with backside cooling.

The large volume of liquid involved in prior art cooling for electrostatic chucks creates a large thermal mass whose temperature cannot be changed rapidly.

Thermoelectric units have been thought of before for use in semiconductor process equipment.

Wright, et al, U.S. Pat. No. 5,584,183 pertains to a thermoelectric exchange for transferring heat between two fluids, as in semiconductor process equipment.

SUMMARY OF INVENTION

An object of the invention is an electrostatic chuck utilizing thermoelectric cooling technology.

Another object is such a chuck wherein uniform and stable contact is maintained between the chuck's body and the thermoelectric cooling.

Still another object is such a chuck wherein the distance between the thermoelectric cooling and the chuck's clamping surface is kept to a minimum to reduce thermal resistance, while maintaining the chuck's overall stiffness so as to keep its clamping surface within acceptable flatness limits.

These and other objects, features and advantages are accomplished in accordance with the teachings of the present invention, one illustrative embodiment of which comprises an electrostatic chuck that includes a conductive circular base with an upper ring portion forming a first pole piece and electrically isolated from an annular portion forming a second pole piece. The upper surface of the pole pieces have a dielectric material formed thereon and together form the electrostatic clamping surface for an article to be held thereon. The backside is provided with an annular recess containing a plurality of thermoelectric devices or modules and intervening spokes. The devices are covered with a heat sink or cooling plate through which a fluid such as water is circulated. A retaining back ring covers the water plate which is secured to bolts. Uniform pressure is applied to the water plate and modules by means of spring washers inserted between back ring and water plate.

BRIEF DESCRIPTION OF THE DRAWING

Other objects, features and advantages of the invention will be apparent from the following detailed description and accompanying drawing, where.

DETAILED DESCRIPTION

Figure 1:
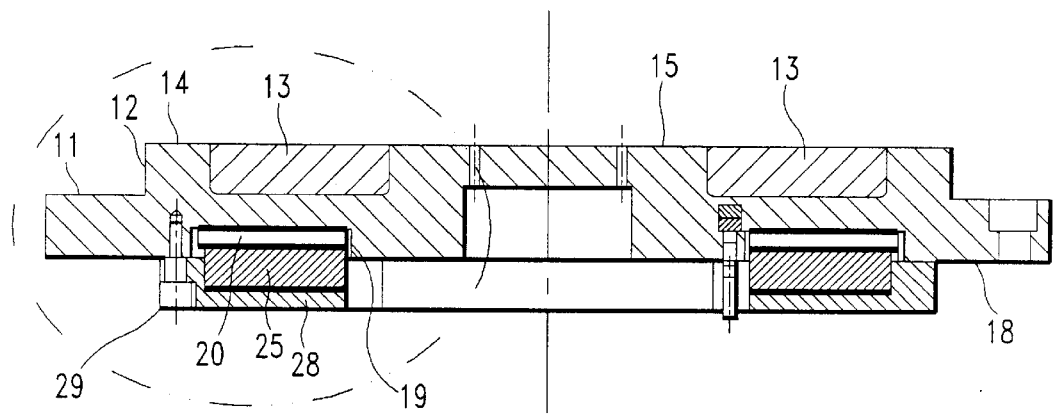
FIG. 1 is a side sectional view of a portion of an electrostatic chuck constructed in accordance with the teachings of the present invention.
Figure 2:
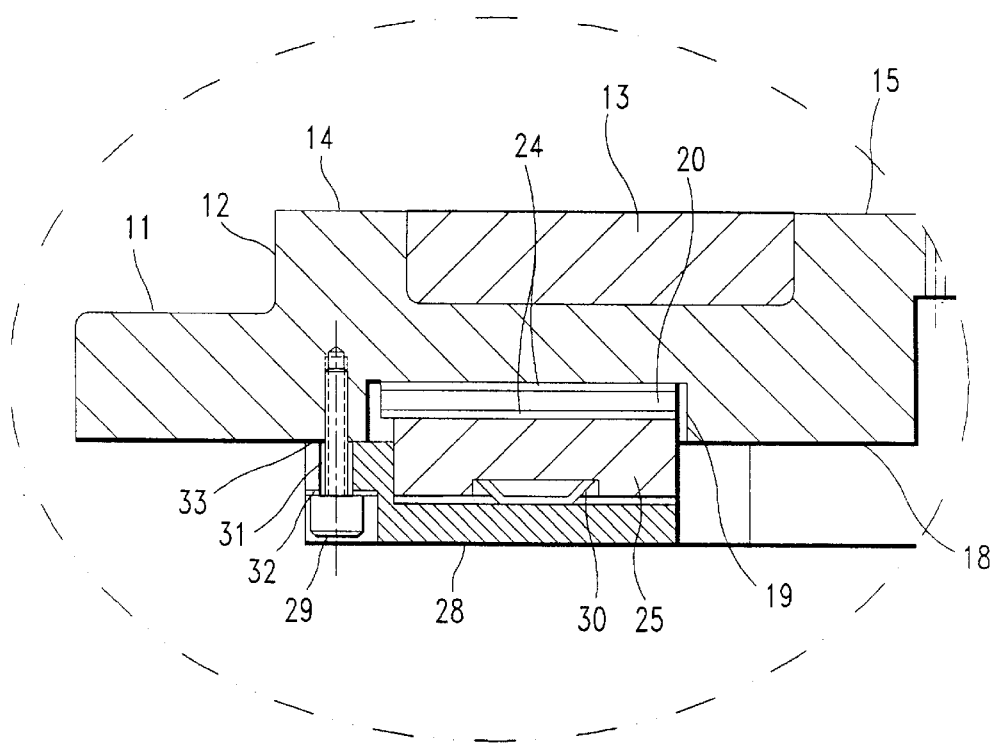
FIG. 2 is an enlarged side sectional view, broken away, of a portion of the electrostatic chuck shown in FIG. 1.

Referring now to the drawing, there is shown so much of an electrostatic chuck 10 as is necessary for an understanding of the present invention.

The chuck 10 is seen as including a circular base 11 of aluminum alloy with an upper ring portion 12 forming a first pole piece, but electrically isolated from, an annular portion 13 of aluminum alloy forming a second pole piece. The upper surfaces 14, 15 of the first 12 and second 13 pole pieces have a dielectric material formed thereon (not shown) and together form the electrostatic clamping surface for an article such as semiconductor wafer, dielectric substrate, panel display and the like to be held thereon during processing. Power input to the pole pieces is seen at 16, 17 in FIG. 3 of the drawing.

The backside or bottom surface 18 of the chuck base 11 is provided with an annular recess 19. This space, in prior art structures, is normally used for water channels in the chuck.

In accordance with the teachings of the present invention the recess is provided with a plurality of electrically connected, square-shaped thermoelectric devices or modules 20 available from commercial sources such as Solid State Cooling Systems, Inc. The thickness of the metal in the chuck body 11 between these modules 20 and the top clamping surface is thus kept to a minimum to reduce thermal resistances. Power input to the modules is seen at 21, 22 in FIG. 3.

At the same time, the overall stiffness of the chuck must be maintained to keep it within acceptable flatness limits, e.g., 0.0002 in. over the clamping surface.

Accordingly, intervening pie shaped spokes 23 of thick metal are created during machining of the recess 19, between the modules 20. A heat conductive paste 24 cements the modules 20 to the bottom surface of the recess 19.

The bottom surface of the recess 19 and the module surfaces are flat and parallel so as to allow maximum contact area between same. Flatness is preferably within 0.0005 in.

Figure 3:
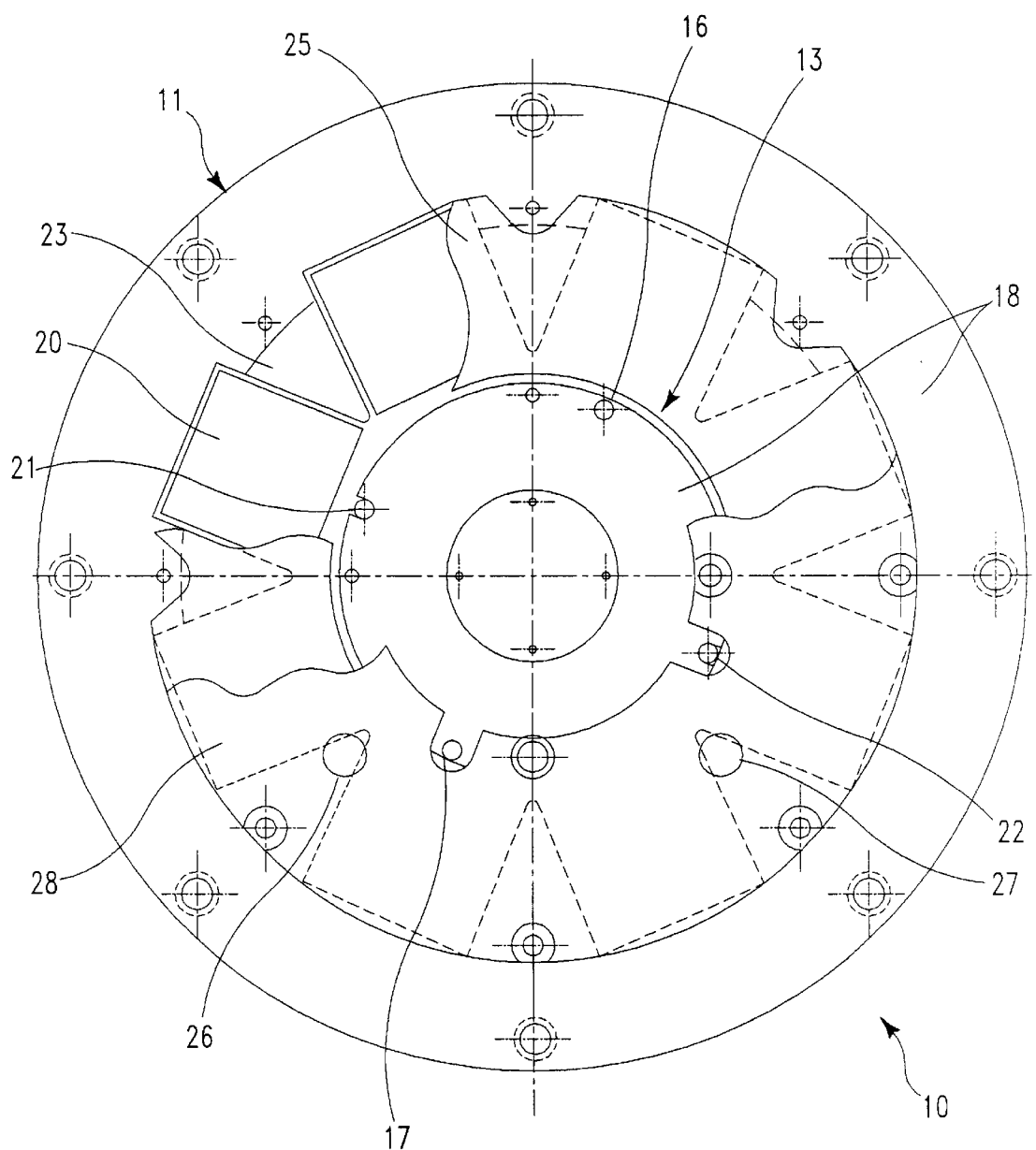
FIG. 3 is a bottom view, partially broken away, of the electrostatic chuck constructed in accordance with the teachings of the present invention; and, FIG. 4 is a chart of temperature versus time showing stepped changes in the set point temperatures compared to actual measured response temperature.

The modules 20 are then covered with a heat sink or cooling plate 25 through which a fluid such as water is circulated. Fluid inlet and outlet to the plate are shown in FIG. 3 at 26, 27. A heat conductive paste 24 cements the plate 25 to the modules 20.

The modules 20 and water plate 25, are then covered by a retaining back cover ring 28 which is secured to the chuck base by bolts 29.

Uniform pressure is applied to the water plate 25 and modules 20 to maintain uniform and stable contact between same and the chuck body 11 by means of spring washers 30 inserted between the back cover ring 28 and water plate 25.

It is preferable that the vertical dimensions and flatness of all components be maintained to within 0.0002 in. so that pressure will be controlled and uniform. If this is not the case then non-uniform heat transfer may result, or even cracking of the thermoelectric modules 20 which contain ceramic.

Electrical isolation of the modules and water plate 25 is maintained by the use of insulating bushings (not shown) at the water feed points and by insulated bushings 31 about the clamping bolts 29. A ceramic washer 32 about the bolts 29 isolates the back cover ring 28 from the bolts 29 and chuck base 11. A polymide sheet 33 may be used to guard against surface arcing between the chuck body and the cooling device.

It is seen that the thermoelectric cooling means is integrated within the electrostatic chuck to form an overall package that will fit existing system designs. The cooling means is relatively thin. It is shaped to fit the available cooling surface at the back of the chuck. It provides fast response to the heat loads, is adaptable for easy retrofit into existing chucks and has greater potential for reliability over conventional cooling means.

Figure 4:
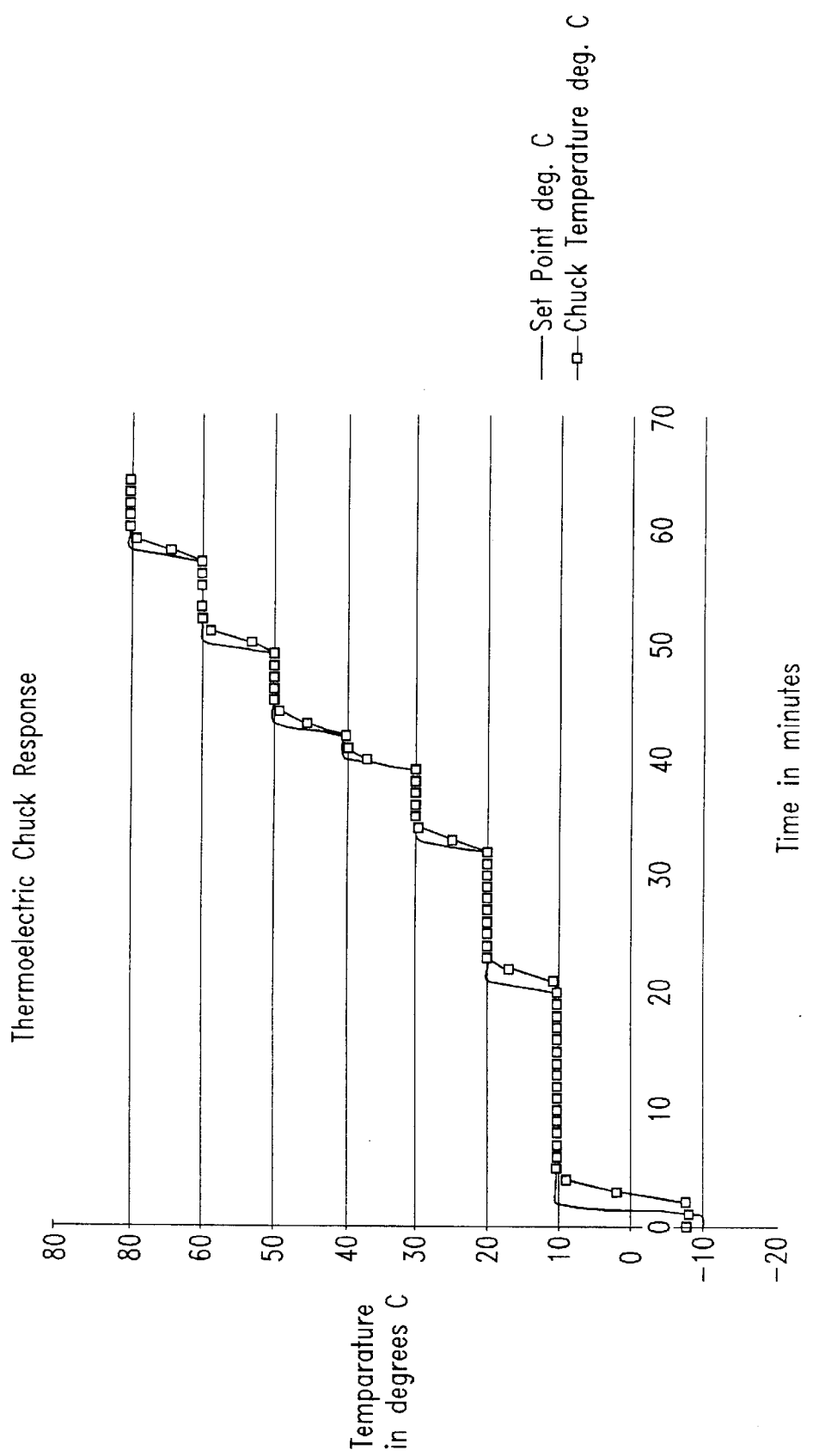

Thus, for example, FIG. 4 shows, from −10° C. to +70° C. the actual measured response temperature of the clamping surface of a chuck constructed in accordance with the teachings of the present invention versus the stepped input to the thermoelectric devices, over time. It is seen that response time is much more rapid than with prior art chucks.

Also, although a bipolar chuck ulitizing a conductive base is shown, the invention is applicable to unipole, tripolar or multipolar design and with an isolated base construction.

It should be obvious that changes, additions and omissions may be made in the details and arrangement of parts without departing from the scope of the invention, as hereinafter claimed.

What is claimed is:

1. An electrostic chuck comprising:
    a base having
        a top clamping surface, and
        a bottom surface;
    an annular recess provided in the bottom surface;
    a plurality of spaced thermoelectric devices disposed within the annular recess;
    a plurality of intervening members disposed within the annular recess between the thermoelectric devices;
    a heat sink covering the thermoelectric devices;
    a retaining ring secured to the base and covering the heat sink; and,
    a spring washer disposed between the heat sink and retaining ring.

2. An electrostatic chuck comprising:
    a base having
        a top clamping surface, and
        a bottom surface provided with a recess;
    a heat sink;
    a thermoelectric device sandwiched between the heat sink and the bottom surface of the base within the bottom surface recess;
    a cover disposed over the heat sink and secured to the base for holding the heat sink and thermoelectric device in place; and,
    a spring washer disposed between the cover and heat sink.

* * * * *